Patented Oct. 10, 1939

2,176,033

UNITED STATES PATENT OFFICE 2,176,033

CRUDE CANE AND BEET SUGARS AS STABILIZERS

Sidney Musher, New York, N. Y., assignor to Musher Foundation Incorporated, New York, N. Y., a corporation of New York No Drawing. Application February 18, 1939, Serial No. 257,099

10 Claims. (Cl. 99—150)

This invention relates to the stabilization of aqueous oil emulsions and other aqueous materials and particularly aqueous food products against oxidative deterioration, and desirably when the aqueous material is subjected to a treatment at elevated temperatures.

An object of this invention is the stabilization of substantially aqueous food materials and particularly of the oil contained in oil-in-water emulsions and colloids.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with this invention, there is preferably used substantially crude unbleached and unrefined cane sugar and desirably in crystalline and sterilized form, and containing in excess of 90% total water soluble carbohydrates.

The preferred stabilizing sugar is crude unrefined cane sugar containing in excess of 90% and desirably over 95% total water soluble carbohydrates, in crystalline form and substantially non-gummy and non-resinous.

The non-sugar materials in this crude sugar are all derived from the sugar cane and are removed at the time of extraction. The crude sugar should be substantially devoid of such pro-oxygenic substances as might have been present in the sugar cane.

Another preferred stabilizing sugar may be made by dissolving the crystallized crude cane sugar occurring as large crystals in water, filtering through a non-bleaching earth to remove dirt and other extraneous and objectionable matter and where necessary, heating to 180° F. for 5 minutes to sterilize. The syrup thus obtained may be recrystallized and the mother liquor desirably added back to the crystals first formed and the crystals will be small, of pale yellow or brown color.

When the crude sugars are subjected to any refinement such as to treatment with charcoal, bone black, bleached, etc., and processed as in the manufacturing of refined cane sugar, household brown sugar, etc., they are of no value as stabilizers and may not be successfully utilized therefor, and it is therefore important to omit these bleaching procedures.

Among the classes of materials that may particularly be treated in accordance with this invention are the aqueous materials and particularly those existing in the form of oil-in-water emulsions such as dairy emulsions including milk, cream, condensed milk, ice cream, etc., mayonnaise, etc.

Example I

To milk susceptible to the development of oxidized flavors was added

A. 1.0% of crude cane sugar after having been clarified by filtration and recrystallized.

B. 1.0% of refined cane sugar.

The milks were examined for oxidized flavor development after standing at 50° F., the number of + signs indicating the degree of oxidized flavor.

|  | After— | | |
|---|---|---|---|
|  | 24 hours | 48 hours | 72 hours |
| Milk A | − | + | ++ |
| Milk B | − | ++ | +++ |

The amount of crude sugar needed to stabilize milk and similar emulsions depends upon such factors as the degree of protection desired, the amount of sugar or sweetness normally present, etc. In the case of dairy products, for example, from 0.1% to 15.0% of the crude sugar may be added, and it may be used either in its entirety or in partial replacement for refined cane sugar.

In mayonnaise, the crude sugar will generally replace entirely the refined sugar normally used or be used in the amount of 1.0% to 3.0%, for example.

Example II

An ice cream mix contaminated with 2 p. p. m. of CuSO₄ was prepared

A. With 10% refined cane sugar.

B. With 5% refined sugar and 5% crystallized crude cane sugar.

The mixes were flavored with strawberries, frozen, stored at 15° F. and observed for oxidized flavor development.

|  | After— | | |
|---|---|---|---|
|  | 2 weeks | 4 weeks | 8 weeks |
| Ice cream A | ++ | +++ | ++++ (inedible) |
| Ice cream B | ± | + | ++ |

Even though the crystallized crude cane sugar thus utilized is added to the aqueous phase of an emulsion and is completely soluble therein, and is not added to the oxidizable oily or fatty disperse phase itself which is in globule form in the emulsion and surrounded with a protein film or similar emulsifying coating, nevertheless it exerts its effectiveness far greater than if added directly to the disperse phase of the emulsion.

The crude cane sugar is not only effective in stabilizing an oil-in-water emulsion such as cream, by addition to the aqueous phase, but when that emulsion is broken and the cream churned into butter, the effectiveness of the crude cane sugar is substantially retained in the fat portion of the emulsion, in this case the butter.

*Example III*

To a 35% butter fat containing cream was added 2% of crude cane sugar. To another sample of the cream was added 2% of refined cane sugar. To both creams were added 3 p. p. m. $CuSO_4$ to accelerate decomposition. The creams were set aside at 50° F. and observed for oxidized flavor development.

|  | Oxidized flavor after— | | |
| --- | --- | --- | --- |
|  | 24 hours | 48 hours | 72 hours |
| Cream containing crude sugar | − | ± | + |
| Cream containing refined sugar | + | ++ | +++ |

*Example IV*

The creams used in Example III were churned into butter, and the resultant butters were stored at 50° F. and scored for quality and retention of fresh flavor.

|  | Score after— | |
| --- | --- | --- |
|  | 2 weeks | 6 weeks |
| Butter from cream containing crude sugar | 90.5 | 90.0 |
| Butter from cream containing refined sugar | 90.0 | 89.0 |

The crude cane sugar may be used for addition to emulsions containing such glyceride oils as cocanut oil, cottonseed oil, soya oil, fish liver oils, etc.

Crude cane sugar may also be used in lieu of or in addition to refined sugar to stabilize the substantially aqueous foods containing readily oxidizable colloids or essential oils such as beverages, including orange juice, orange concentrates, carbonated beverages, flavoring concentrates, ginger ale, colas, fruit juices, vegetable juices, and similar substances containing the essential oils in dispersed form. It may also be used for egg white, egg yolk, soups, desserts, jams and jellies, butter creams, caramels and similar confections, etc.

In these products the crude cane sugar may be used in amounts of from 0.5% to 15% by weight of the beverage or confection and either in partial or complete replacement for the refined sugar normally used.

As an example of an aqueous food containing an essential oil such as orange oil readily susceptible to oxidation:

*Example V*

To one lot freshly prepared orange juice made from Valencia oranges was added 3% of crude cane sugar. To another lot of juice prepared from the same oranges was added 3% of refined cane sugar. Both lots were then held at 20° F. and observed at 15 day intervals. Beginning at the first test period after 15 days and extending through the duration of the experiment of 60 days, a definite improvement in the fresh flavor of the orange was observed over the juice prepared with the refined cane sugar.

The crude sugars described may also be used to advantage in curing operations such as in the wet curing of meats and fish, and for other curing purposes where an aqueous sugar or brine solution is prepared.

For example, crude cane sugar may be used to advantage is stabilizing the fresh flavor of fruits such as peaches, pears, plums, cherries, etc., and for similar purposes where oxidative deterioration involving both flavor loss and change and discoloration are so troublesome. The crude cane sugar may be used in complete or partial replacement for refined sugar normally used in the curing of fruits before canning or in the canning of fruits.

Where the crude sugar is clarified and recrystallized for purposes of sterilization, it is highly desirable for the antioxidant values left in the liquor or washings from the clarified and recrystallized sugars to be recombined with said clarified, recrystallized sugar. This may be done by merely adding this liquor or washings, with further treatment or concentration, to the recrystallized crude sugar, followed by drying, or the clarified crystallizable mixture after evaporation may be permitted to crystallize without separation of the mother liquor or with removal of a part of the mother liquor. This modified crude sugar possesses considerably more stabilizing power than the crystallized crude sugars free of the values in the liquor or washings.

*Example VI*

To cream containing 32% butterfat was added 2 p. p. m. of $CuSO_4$ and

A. 5% clarified and recrystallized crude cane sugar with removal of the mother liquor.

B. 5% clarified and crystallized crude cane sugar modified as above with retention of all of the mother liquor.

The creams were placed into storage for 4 weeks at −10° F. at the end of which time they were removed, made into strawberry ice cream, and tested for oxidized flavor development.

|  | After— | | |
| --- | --- | --- | --- |
|  | 1 week | 2 weeks | 3 weeks |
| Ice cream made with cream A | − | ++ | +++ |
| Ice cream made with cream B | − | − | − |

It is particularly desirable for the crude cane sugar to be subjected to elevated temperatures after dispersing in the oxidizable aqueous food material in order to develop much more markedly beneficial results. The results obtained when the crude sugar is heated after dispersing in the aqueous oxidizable material are surprising in view of the normal expectation, that keeping quality and inhibiting activity would be reduced at elevated temperatures.

The heat treatment should desirably be carried out at temperatures of 145° F. or above and desirably above 200° F., and the heated materials may be immediately allowed to cool or heated for periods up to 5 or 10 minutes or more in order to produce the desired interaction between the crude cane sugar and the oxidizable material.

It is not possible merely to heat the crude cane sugar alone before addition to the oil and then add it to the oil, for the desired effect will not be attained under those circumstances. It is evident, therefore, that when the crude cane sugar is heated in the aqueous materials, it does not merely act as a negative oxidation catalyst in the same manner as ordinary antioxidants, such as hydroquinone, but reacts with the oxidizable material to produce the stabilization.

It is even desirable for the heating to be conducted in the entire body of oxidizable material and not in any small fraction thereof. The maximum stabilizing effects are obtained only when the heating is conducted using the entire mass of aqueous food material to be stabilized indicating further the reaction obtained by the heat treatment rather than negative catalysis.

Example VII

A strawberry ice cream mix was prepared using readily oxidizable cream and with

A. 5% of clarified raw cane sugar containing the mother liquor and 10% refined cane sugar.

B. 15% refined cane sugar.

The mixes were than heated to 150° F. for 10 minutes, made into ice cream, and the ice cream was left standing at 10° F. The results are given below, the number of + signs indicating degree of oxidized flavor.

| | After— | | |
|---|---|---|---|
| | 4 weeks | 8 weeks | 12 weeks |
| Ice cream A | − | + | ++ |
| Ice cream B | + | +++ | ++++ (inedible) |

Example VIII

Raspberry, orange and lemon syrups were prepared with clarified raw cane sugar containing the mother liquor in replacement for refined cane sugar normally used. The syrups were heated to 215° F. during the concentrating process. They were then set aside at room temperature for 60 days and used in the preparation of a candy filler between two wafers. Organoleptic results on the wafers follow based upon a perfect flavor score of 100.

| | After— | | |
|---|---|---|---|
| | 0 weeks | 4 weeks | 8 weeks |
| Raspberry raw cane | 95 | 90 | 85 |
| Raspberry refined cane | 90 | 85 | 75 |
| Orange raw cane | 85 | 85 | 75 |
| Orange refined cane | 75 | 65 | 50 |
| Lemon raw cane | 85 | 80 | 75 |
| Lemon refined cane | 80 | 65 | 60 |

Example IX

Cream containing 35% butterfat was mixed with

A. 10% raw cane sugar, heated to 180° F. for 5 minutes; then frozen at −10° F.

B. 10% raw cane sugar, the cream having been heated to 180° F. for 5 minutes before the sugar was added; then frozen at −10° F.

C. 10% refined cane sugar, heated to 180° F. for 5 minutes; then frozen at −10° F.

The cream was stored for 4 months, then made into strawberry ice cream and observed for oxidized flavors.

| | Degree of oxidized flavor after— | | |
|---|---|---|---|
| | 0 days | 10 days | 20 days |
| Made with sugar A | − | − | ± |
| Made with sugar B | ± | ++ | ++ |
| Made with sugar C | ++ | +++ | +++ (inedible) |

The various grades of refined sugar including ordinary refined cane sugar, granulated sugar, powdered sugar, brown sugar, etc., do not possess the antioxygenic character of the crude raw sugar of the present application.

Extracts of crude cane sugar may also be utilized, particularly as obtained by the use of a solvent having the formula XOH where X is a low molecular weight aliphatic group. For example, the ethyl alcohol soluble extract of raw cane sugar may be prepared by mixing equal parts by weight of alcohol and sugar, removing the undissolved portion, and distilling the alcohol. When extracts of that nature are employed as little as from 0.01% to 2% may be added to the oils, which oils are then preferably subjected to a heat treatment in order to enhance the stabilizing activity.

In addition to raw cane sugar, raw beet sugar may be employed as a stabilizer in an analogous manner to the use of the cane products. Under conditions of heat treatment such as when the aqueous materials as in the nature of dairy products, confections, etc., are heated at between 145° F. and 250° F., these raw beet products become particularly effective stabilizing agents.

The various beet products include the raw beet sugar, the clarified raw beet sugar, and particularly with the washings added back, the alcohol extract of the raw beet sugar, etc.

Example X

Raw beet sugar was compared with refined beet sugar by adding to milk susceptible to oxidized flavors, heating that milk to 160° F. for 15 seconds, permitting the milk to stand at 50° F. and testing for oxidized flavor development.

| | After— | | |
|---|---|---|---|
| | 24 hours | 48 hours | 72 hours |
| Milk containing 1% raw beet sugar | − | ± | + |
| Milk containing 1% refined beet sugar | + | ++ | +++ |

This application is a continuation-in-part of application Serial No. 134,184, filed March 31, 1937.

Having described my invention what I claim is:

1. In a water containing food composition normally subject to oxidative deterioration, substantially stabilized against such deterioration, a stabilizing agent consisting of a relatively small proportion of an organic material selected from the group consisting of crude cane sugar and crude beet sugar having in excess of 90% total water soluble carbohydrates.

2. In a water containing food composition normally subject to oxidative deterioration, substantially stabilized against such deterioration, a stabilizing agent consisting of a relatively small proportion of an organic material selected from the group consisting of crude cane sugar, crude beet sugar, and their extracts obtained using a solvent having the formula XOH where X is a low molecular weight aliphatic group.

3. A substantially stabilized oil containing aqueous emulsion normally subject to oxidative deterioration containing a small proportion of a crystallized water soluble crude cane sugar material having in excess of 90% total water soluble carbohydrates.

4. A substantially stabilized oil containing aqueous food composition normally subject to oxidative deterioration containing a small proportion of an organic material selected from the group consisting of crystallized crude cane sugar and crystallized crude beet sugar.

5. A method for stabilizing aqueous food compositions normally subject to oxidative deterioration which comprises adding thereto a relatively small proportion of an organic material selected from the group consisting of crude cane sugar, crude beet sugar, and their extracts obtained using a solvent having the formula XOH where X is a low molecular weight aliphatic group.

6. In a water containing food composition normally subject to oxidative deterioration, substantially stabilized against such deterioration, a stabilizing agent consisting of a relatively small proportion of a clarified and recrystallized antioxygenic crude cane sugar.

7. A method for stabilizing aqueous food compositions normally subject to oxidative deterioration which comprises adding thereto a relatively small proportion of a clarified and recrystallized antioxygenic crude cane sugar.

8. A substantially stabilized ice cream resistant to oxidative deterioration containing a small proportion of an organic material selected from the group consisting of crude cane sugar, crude beet sugar, and their extracts obtained using a solvent having the formula XOH where X is a low molecular weight aliphatic group.

9. A substantially stabilized dairy cream resistant to oxidative deterioration containing a relatively small proportion of an organic material selected from the group consisting of crude cane sugar, crude beet sugar, and their extracts obtained using a solvent having the formula XOH where X is a low molecular weight aliphatic group.

10. A substantially stabilized, carbonated, flavored food beverage resistant to oxidative deterioration containing a relatively small proportion of an organic material selected from the group consisting of crude cane sugar, crude beet sugar, and their extracts obtained using a solvent having the formula XOH where X is a low molecular weight aliphatic group.

SIDNEY MUSHER.